United States Patent [19]

Stockholm

[11] 4,133,115
[45] Jan. 9, 1979

[54] MULTIPLE VIAL UNIVERSAL FLANGE LEVEL ASSEMBLY FOR FLANGED PIPES AND THE LIKE

[76] Inventor: Charles A. Stockholm, 7685 Hwy. 105, Beaumont, Tex. 77706

[21] Appl. No.: 848,148

[22] Filed: Nov. 3, 1977

[51] Int. Cl.² .............................................. G01C 9/28
[52] U.S. Cl. ...................................................... 33/371
[58] Field of Search .................................. 33/379–383, 33/370–373

[56] References Cited

U.S. PATENT DOCUMENTS

| | | | |
|---|---|---|---|
| 2,531,799 | 11/1950 | Zumwalt | 33/370 X |
| 3,762,068 | 10/1973 | Clay | 33/372 X |
| 3,822,481 | 7/1974 | Doan | 33/371 |

*Primary Examiner*—Charles E. Phillips
*Attorney, Agent, or Firm*—Mason, Fenwick & Lawrence

[57] ABSTRACT

A multiple vial universal flange level assembly for leveling and squaring the flange of a pipe section having a preassembled or subsequently assembled flanged end, including an elongated bar-like main frame having first and second bubble vials oriented to indicate when the main frame is oriented horizontally both transverse and parallel to the pipe section axis and third and fourth bubble vials for indicating when the main frame longitudinal axis is in a vertical plane when non-horizontal, together with first and second pairs of centering cones and a pair of associated rods insertable into apertures of the flange for removably assembling the main frame onto the flange.

4 Claims, 5 Drawing Figures

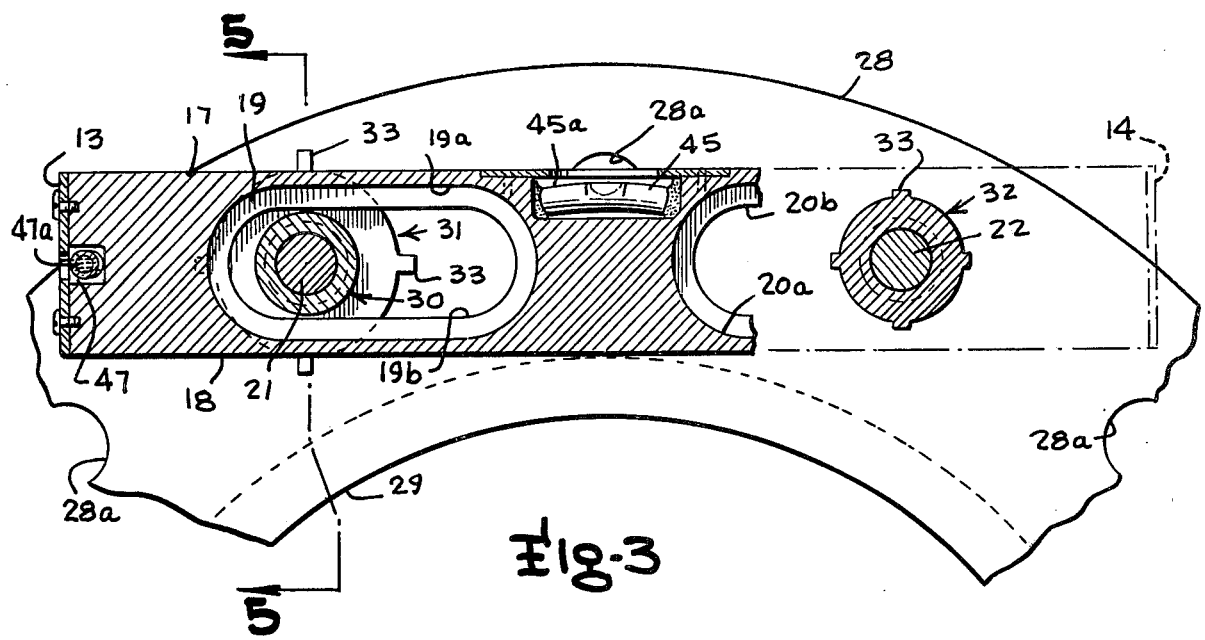
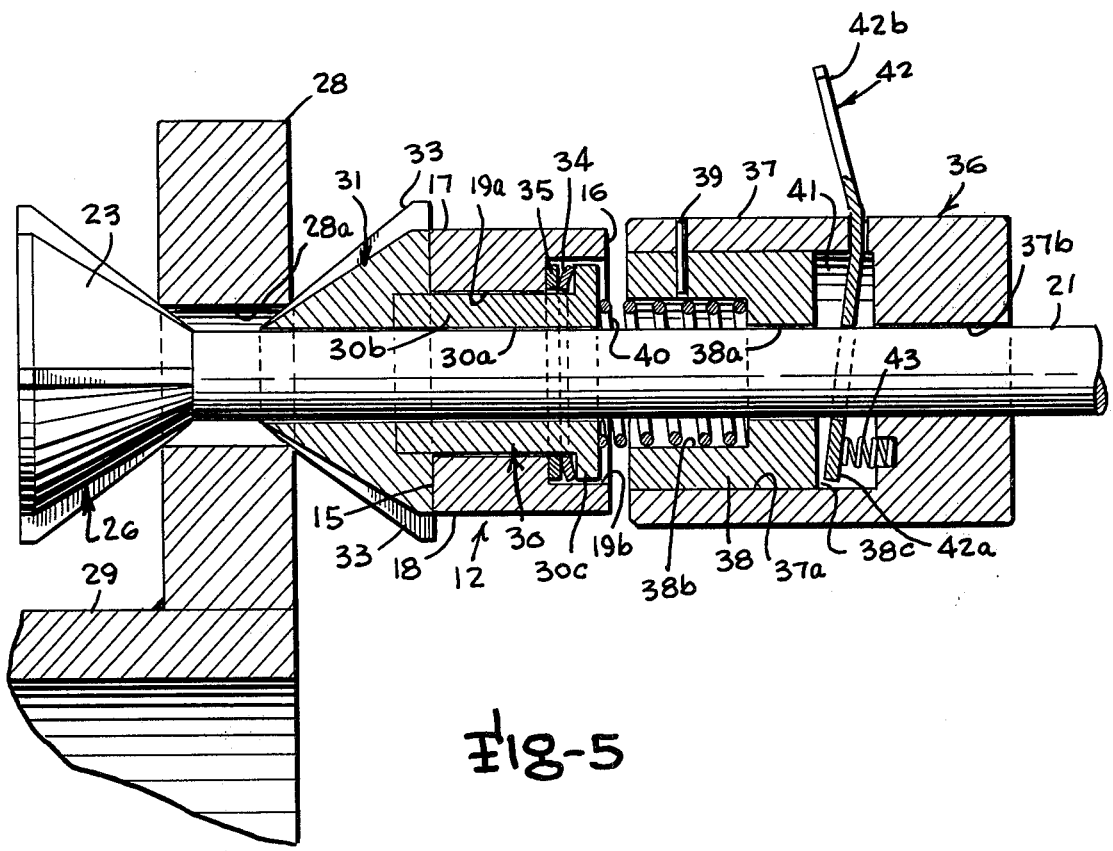

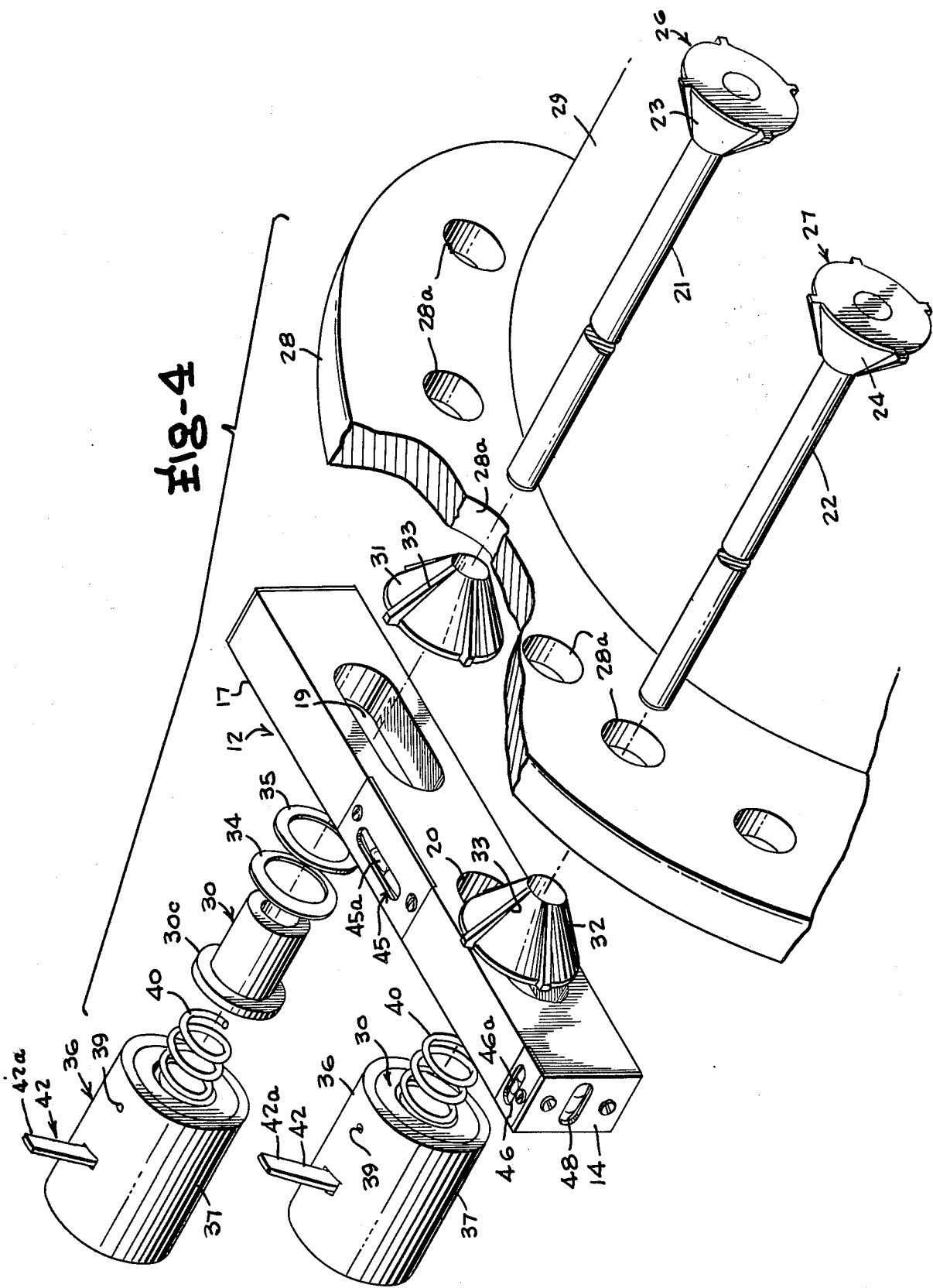

MULTIPLE VIAL UNIVERSAL FLANGE LEVEL ASSEMBLY FOR FLANGED PIPES AND THE LIKE

BACKGROUND AND OBJECTS OF THE INVENTION

The present invention relates in general to spirit level assemblies having a plurality of level vials incorporated therein for indicating disposition of various portions of the level instrument from horizontal and vertical positions, and more particularly to spirit level assemblies for use by pipefitters and artisans who assemble and mount flanged pipe sections and flanges onto pipe sections, having means incorporated in the assembly for removably and releasably coupling the portions of the apparatus housing bubble vials disposed at various orientations to the flange member at positions to enable the pipe fitter to accurately locate the flange in desired positional relationship to horizontal and vertical planes.

Heretofore, levels of the general type frequently referred to as spirit levels, for use by various artisans, particularly carpenters, masons, electricians, plumbers and the like, have generally been formed as an elongated frame of wood or extruded metal having a plurality of liquid filled vials mounted at various positions along the elongated frame disposed to indicate when the contact surface or surfaces of the frame, usually the longitudinal upper and lower edges thereof, are disposed horizontally or vertically or at predetermined angular positions to the horizontal. Most frequently, the levels have been made of extruded metal frames having an I-beam configuration, with the level indicating bubble vials mounted in the thin web portion of the I-beam frame, either by means permanently fixing the ends of the liquid and bubble tubes of the vials in the web portion of the frame or by mounting structures such as lens and ring orming plastic mounts for the bubble and liquid tubes of the vials which are then precisely adjusted in proper angular positions to the contact surfaces at the factory in test jigs or similar test devices. Other spirit level instruments of the type sometimes referred to as torpedo levels have been produced, wherein the frame is a cast metallic frame of generally streamlined or torpedo shape in top plan view having upper and lower parallel planiform longitudinal contact surfaces to be held against the structural member to be levelled and having a plurality of liquid filled vials arranged in the frame to indicate horizontal, vertical and predetermined angular positions of the contact surfaces. However, spirit level devices of the type heretofore commercially available to my knowledge, have not included special means for facilitating mounting of the leveling instrument in predetermined relation to the flange portion of a pipe section such as is needed by pipefitters to properly locate the flange for welding to its pipe section or orient the flange end of a flanged pipe section in predetermined angular positions, which facilitate easy, accurate supporting of the main frame portion of the leveling instrument and its indicating vials adjacent the flange in properly centered and aligned relation for readily indicating when the flange is positioned precisely in the desired disposition relative to and horizontal to vertical planes to enable proper alignment and squaring up of the flange.

An object of the present invention, therefore, is the provision of a novel multiple vial universal flange level instrument for pipefitters and the like having a main frame portion supporting a plurality of bubble vials in predetermined angular position for proper alignment of an apertured flange portion of a pipe section or the like and having centering cones and rod members insertable through the holes in the flange to be aligned, adapted for use with holes of various diameters, coactive with releasable locking slide cylinders receivable on the centering cone rods for releasably holding the flange level assembly on the flange at predetermined positions facilitating rapid accurate vertical disposition and alignment of the flange.

Other objects, advantages and capabilities of the present invention will become apparent from the following detailed description, taken in conjunction with the accompanying drawings, illustrating a preferred embodiment of the invention.

BRIEF DESCRIPTION OF THE FIGURES

FIG. 3 is a vertical transverse section view, taken along the line 3—3 of FIG. 1;

FIG. 4 is an exploded view, as seen from the rear of the assembly; and

FIG. 5 is a vertical section view, to enlarged scale, taken along the line 5—5, FIG. 3.

DETAILED DESCRIPTION OF A PREFERRED EMBODIMENT

Figure 1:
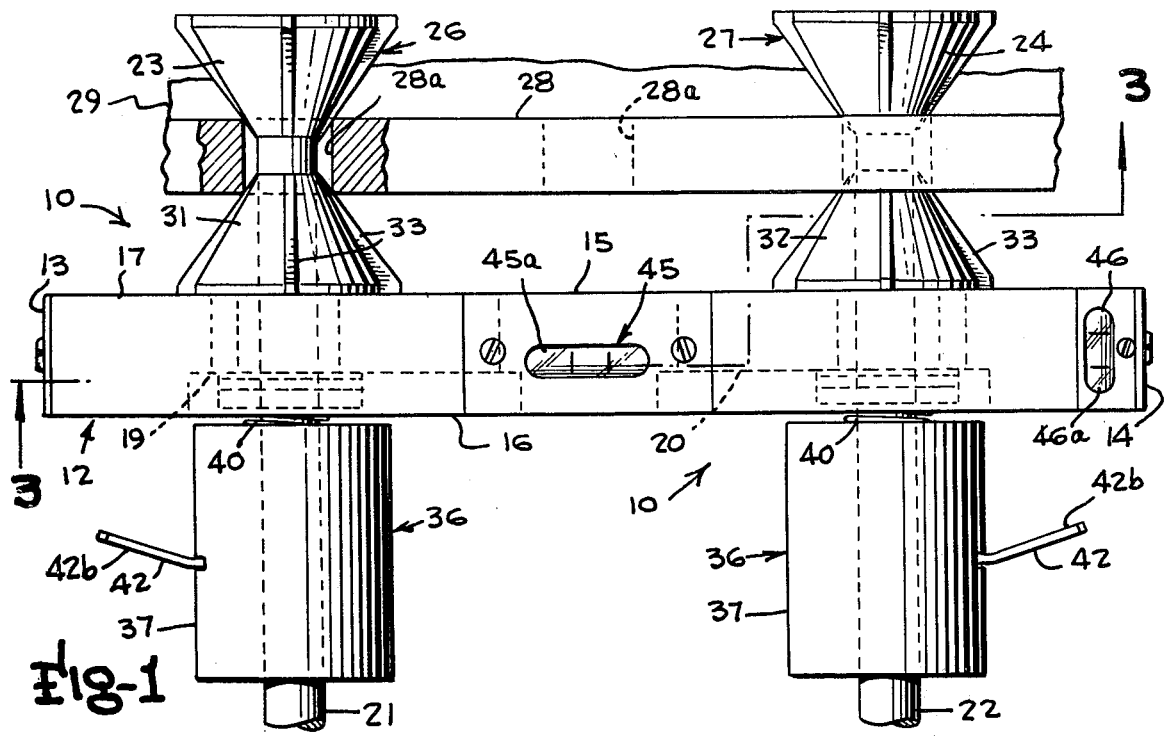
FIG. 1 is a top plan view of a flange level assembly constructed in accordance with the present invention, shown mounted on the flange at an end of a flanged pipe section in condition of use.

Referring to the drawings, wherein like reference characters designate corresponding parts throughout the several figures, the multiple vial universal flange level apparatus of the present invention is indicated generally by the reference character 10, and comprises a main level frame 12 in the form of an elongated generally rectangular block of rectangular cross section, formed for example from an extruded aluminum block, which in one satisfactory example has a length of about 8½ inches, a width of about 1½ inches, and a depth of about 1 inch, providing opposite ends 13, 14, front and back faces 15, 16, and top and bottom flat surfaces 17, 18. Portions of the rectangular solid main frame member number 12 between the longitudinal midpoint thereof, and the opposite ends 13 and 14, are provided with longitudinally elongated slots 19, 20 adapted to receive and accommodate converging and diverging movement longitudinally of the frame 12 of a pair of centering cone rods 21, 22 fixed to and extending from a pair of centering cones 23, 24 at their front or forwardmost ends. For example, the centering cone rods may be approximately ½ inch in diameter and have a length of about 7½ inches protruding from the cones 23, 24, and the centering cones are solid cone-shaped formations having an axial length of about 1 inch and a maximum diameter of about 1½ inches, and have a plurality of generally triangular outwardly protruding rib formations 25 at three or four circumferentially spaced locations about the conical surface of the centering cones 23, 24.

Figure 2:
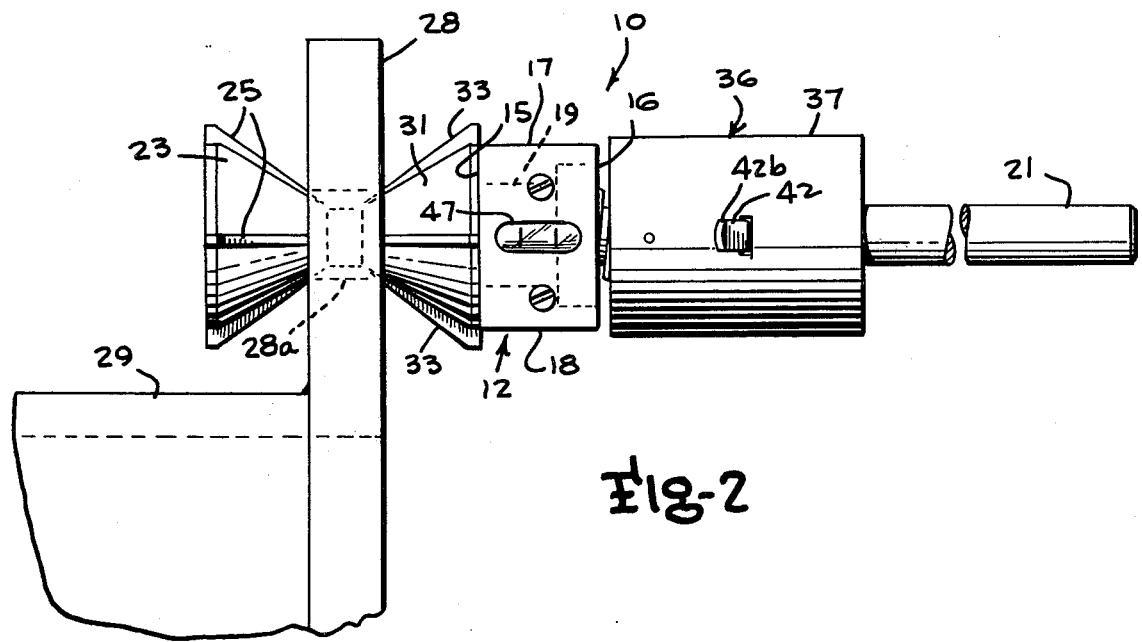
FIG. 2 is a side elevation view thereof, the opposite side elevation being the mirror image thereof.

The centering cone assemblies 26, 27 with their cone formations 23, 24 and elongated rods 21, 22 are designed to be releasably assembled with the end flange 28 of the flanged pipe section 29 to be levelled and aligned and oriented, by inserting the centering cone rod portions 21, 22 through a pair of holes 28a in the flange, which has either already been secured to or formed on the pipe section 29 associated therewith or which is to be positioned and welded to the associated pipe section 29. The rods 21, 22 are pushed through the flange holes 28a until the outwardly facing edges of the rib formations 25 on the centering cones which lie in a conical path engage the edges of the holes 28a in the flange 28 and center the rods 21, 22 therein. For example, as illustrated in FIG. 2, the flange 28 to be levelled and aligned, which may either be already fixed to the associated pipe section 29, or may be welded thereto after being levelled and oriented by use of the level assembly 10, is provided with a plurality of holes 28a in the customary manner, usually spaced uniformly circumferentially about the flange 28 with the centers of the holes 28a located along a circular path concentric with the flange center axis.

Since the circumferential spacing between the flange holes 28a varies with different sizes of flanges and different patterns of flange holes, the slots 19, 20 for receiving the centering cone rods 21, 22 are elongated longitudinally of the frame 12 over the span, for example, of about 2 or 2½ inches to accommodate the level assembly to the various flange hole spacings customarily encountered by permitting the spacing transversely between the rods 21, 22 to be varied over a range of about 4 inches or more. Within the slots 19, 20 of the main frame 12 are received a pair of slide bushings 30 having a cylindrical center bore 30a of a diameter corresponding substantially to the diameter of the centering cone rods 21, 22 to receive the rods therethrough, the portions of the slots 19, 20 nearest the front face 15 of the frame having a narrower width, as indicated at 19a, to correspond to the diameter of the smaller diameter forward portion 30b of the slide bushings 30, and the slots having a wider portion 19b opening through and adjacent to the rear face 16 of the frame to accommodate the larger diameter end flange or rim 30c of the bushing 30. The forwardmost ends of the smaller diameter portions 30b of the slide bushings protrude through the front face 15 of the frame 12 and are fixed, as by welding, to frame supported centering cones 31, 32 like the cones 23, 24, having rib formations 33 thereon like the rib formations 25 and having center openings to pass the cone rods 21, 22 therethrough and through the bores 30a of the associated slide bushings 30. The flat rear faces of the centering cones 31, 32 are resiliently urged rearwardly into abutment with the front face 15 of the main frame 12, by providing a curved or bowed spring washer 34 within the larger width slot portion 19b surrounding the smaller diameter portion 30b of each slide bushing 30 and located between the rear rim 30c of each slide bushing and a flat circular or annular washer 35 bearing against the rearwardly facing transition surface of the associated slot 19 between the smaller width section 19a and larger width section 19b and press fitting or otherwise joining the smaller diameter end of each bushing 30 to the associated centering cones 31, 32 as shown.

Following positioning of the rods 21, 22 of the centering cone assemblies 26, 27 in the appropriate holes of the flange 28 which is to be levelled and aligned, the assembly of the main frame 12 with the centering cones 31, 32 carried thereon is fitted onto the portions of the centering cone rods 21, 22 protruding forwardly through the flange holes 28a and the frame is shifted along the rods 21, 22 toward the flange until the pairs of centering cones 23, 24 and 31, 32 enter the flange holes 28a and abut the bounding edges thereof. This subassembly is then releasably latched onto the flange by cylindrical latch cylinders 36. These latch cylinders 36 are each formed of a main cylindrical portion 37 in the form of a forwardly opening cup having a larger bore 37a opening through the forward end thereof nearest the main frame 12 and having a smaller diameter exit bore portion 37b sized to correspond to the diameter of the centering cone rods 21, 22 and receive the rods therethrough. An inner cup shaped cylindrical filler 38 of shorter axial length than the axial length of the larger diameter bore portion 37a is fitted in the larger diameter bore portion and fixed therein by pin 39, and has a rear bore portion 38a of the same diameter as the bore portion 37b and a larger forwardly opening bore portion 38b to receive a coil spring 40 therein bearing against the transition surface between the bore portions 38a and 38b and the rear face 16 of the main frame 12. The rearmost end wall 38c is spaced forwardly from the transition surface between the bore portions 37b and 37a of the main outer cylindrical portion 37 providing a cavity 41 for receiving a thumb release latch member 42, which has an annular inner end portion 42a provided with a circular hole having a diameter slightly greater than the rods 21, 22 which is resiliently urged by a spring 43 fitted in a socket or well in the cylinder portion 37 to an inclined position relative to the axis of the centering cone rods 21, 22 and having an outwardly projecting finger piece or trip portion 42b extending through an appropriate slot therefor in the side of the cylinder portion 37. It will be appreciated that the latch cylinders 36 are assembled onto the centering cone rods 21, 22 after they have been passed through the flange holes 28a and through the centering cones 31, 32 and the slots of the main frame 12, and the latch cylinders 36 advanced axially along the rods 21, 22 with the thumb latch members 42 depressed to a position allowing free movement of the latch cylinders along the rods until the springs 40 abut the rearmost ends of the slide bushings 30 through which the rods have been passed and the springs are compressed to bring the front faces 36a of the latch cylinders into or near abutment with the rear ends of the slide bushings or the rear face 16 of the main frame 12.

The main frame 12 of the assembly is provided with a first bubble vial unit 45 adjacent its top surface 17 at the midregion thereof visible through an opening 45a in the top surface 17 and designed to indicate when the longitudinal center axis extending between the ends 13 and 14 of the main frame 12 is disposed horizontally. A second bubble unit 46 is provided near one end, for example, the end 14, of the frame 12, visible through an opening 46a in the top surface 17, oriented so that the longitudinal axis of the liquid and bubble tube of the vial 46 is disposed transversely to the longitudinal axis of the main frame 12 parallel to the axes of the centering cone rods 21, 22 to indicate when the front and back faces 15, 16 of the main frame 12 are disposed precisely in vertical planes. A third and fourth bubble vial units 47 and 48 are provided adjacent the ends 13 and 14 of the main frame, visible through sight openings or slots 47a and 48a in the end surfaces 13, 14 to indicate at the ends 13, 14 when the longitudinal axis of the main frame 12 is disposed precisely in a vertical plane when it is tilted from horizontal position, to facilitate precise squaring up of the main frame 12 and flange 28.

What is claimed is:

1. A multiple vial flange level assembly for levelling and squaring a planiform circular flange having circumferentially spaced apertures for a flanged pipe section, including an elongated main frame in the form of an elongated rectangular bar having a length sufficient to span a distance greater than the spacing between a pair of adjacent flange apertures, the main frame having a first bubble vial positioned to indicate when the longitudinal axis of said main frame perpendicular to the axis of the pipe section is precisely horizontal and a second bubble vial for indicating when a second axis of the main frame perpendicular to its longitudinal axis and parallel to the axis of the pipe section is precisely horizontal, first pair of centering cone members adapted to enter from one side of and be centered in the flange apertures and each having an elongated rod projecting therefrom to extend through and beyond the flange apertures, a second pair of centering cone members carried by the main frame to receive said rods therethrough and enter and be centered by the flange apertures, and manually releasable latch members mounted on portions of said rods protruding beyond said main frame and second centering cone members for clamping the main frame and cone members onto the flange by clamping engagement of the cone members in the flange apertures, said main frame including a pair of longitudinally elongated slots slidably supporting bushing members through which said rods extend to receive said rods therethrough and accommodate relative convergent and divergent movement of the rods and cone members longitudinally of the main frame for fitting the level assembly onto flanges with various flange aperture spacings, said bushing members being fixed to respective ones of said second pair of cone members supporting the latter for movement axially of said rods relative to said main frame, said bushing members having an enlarged end portion and a curved annular spring washer surrounding smaller diameter portions of said bushing member and bearing against said enlarged end portions and parts of said main frame to resiliently urge the cone members fixed thereto toward an adjacent confronting face of said main frame.

2. A multiple vial flange level assembly as defined in claim 1, wherein said main frame includes third and fourth bubble vials respectively located in opposite end walls thereof visable through sight openings in said opposite end walls and disposed to indicate when said longitudinal axis in non-horizontal position is precisely located in a vertical plane for squaring off the flange on which the level assembly is supported.

3. A multiple vial flange level assembly as defined in claim 2, wherein said latch members each comprise a cylinder member having a central bore therethrough to receive the respective rods and a resiliently biased catch member having an annular portion surrounding the associated rod and urged to a catch position inclined to the axis of the rod in a plane passing through a diameter of the rod and having a finger-actuating extension projecting from the cylinder member in a plane inclined to the plane of the plane of the annular portion.

4. A multiple vial flange level assembly as defined in claim 1, wherein said latch members each comprise a cylinder member having a central bore therethrough to receive the respective rods and a resiliently biased catch member having an annular portion surrounding the associated rod and urged to a catch position inclined to the axis of the rod in a plane passing through a diameter of the rod and having a finger-actuating extension projecting from the cylinder member in a plane inclined to the plane of the plane of the annular portion.

* * * * *